United States Patent

Latawic

[11] 3,913,461
[45] Oct. 21, 1975

[54] FLUID REACTION DEVICE HAVING AN UNDULATORY FLEXIBLE WALL

[76] Inventor: Stephen H. Latawic, 5037 E. Outer Drive Apt. 201-H, Detroit, Mich. 48234

[22] Filed: July 27, 1973

[21] Appl. No.: 383,435

[52] U.S. Cl. .................... 92/89; 92/140; 417/394
[51] Int. Cl.² .................. F01B 19/00; F16J 3/00
[58] Field of Search ............ 92/90, 89, 98 R, 13.2, 92/13.8, 103, 140; 417/392, 394; 403/121; 64/2 R, 2 P, 3, 4

[56] References Cited
UNITED STATES PATENTS

| | | | |
|---|---|---|---|
| 722,259 | 3/1903 | Sleeper | 92/89 |
| 861,659 | 7/1907 | Johnston | 64/2 P |
| 1,538,166 | 5/1925 | Cass | 92/90 X |
| 2,642,091 | 6/1953 | Morin | 92/90 X |
| 2,721,240 | 10/1955 | Filbert, Jr. | 92/103 M X |
| 3,048,121 | 8/1962 | Sheesley | 417/394 X |
| 3,093,086 | 6/1963 | Altoz et al. | 92/103 M X |
| 3,294,031 | 12/1966 | Latawic | 92/90 X |
| 3,440,970 | 4/1969 | Wagner | 417/394 X |
| 3,529,908 | 9/1970 | Smith | 92/13.2 X |

FOREIGN PATENTS OR APPLICATIONS
911,562   5/1954   Germany .......................... 64/2 R

*Primary Examiner*—Martin P. Schwadron
*Assistant Examiner*—Abraham Hershkovitz
*Attorney, Agent, or Firm*—Barnes, Kisselle, Raisch & Choate

[57] ABSTRACT

A fluid reaction device having an elongated flexible wall mounted in a fluid chamber in an undulatory configuration and adapted to undergo undulatory motion in response to fluid flowing through the chamber. The flexible wall is formed of a number of individual segments pivotally engaged with each other in a manner that limits the maximum radius of curvature in each crest and achieves smooth motion of the wall. Spring biasing at each end of the wall preloads the wall into the desired configuration and permits the wall to elongate during its undulatory motion. The wall is engaged by a plurality of reciprocating plunger rods spaced along the length of the wall. The rods drive a ratchet mechanism to convert the undulatory motion of the wall into a rotary shaft output.

14 Claims, 15 Drawing Figures

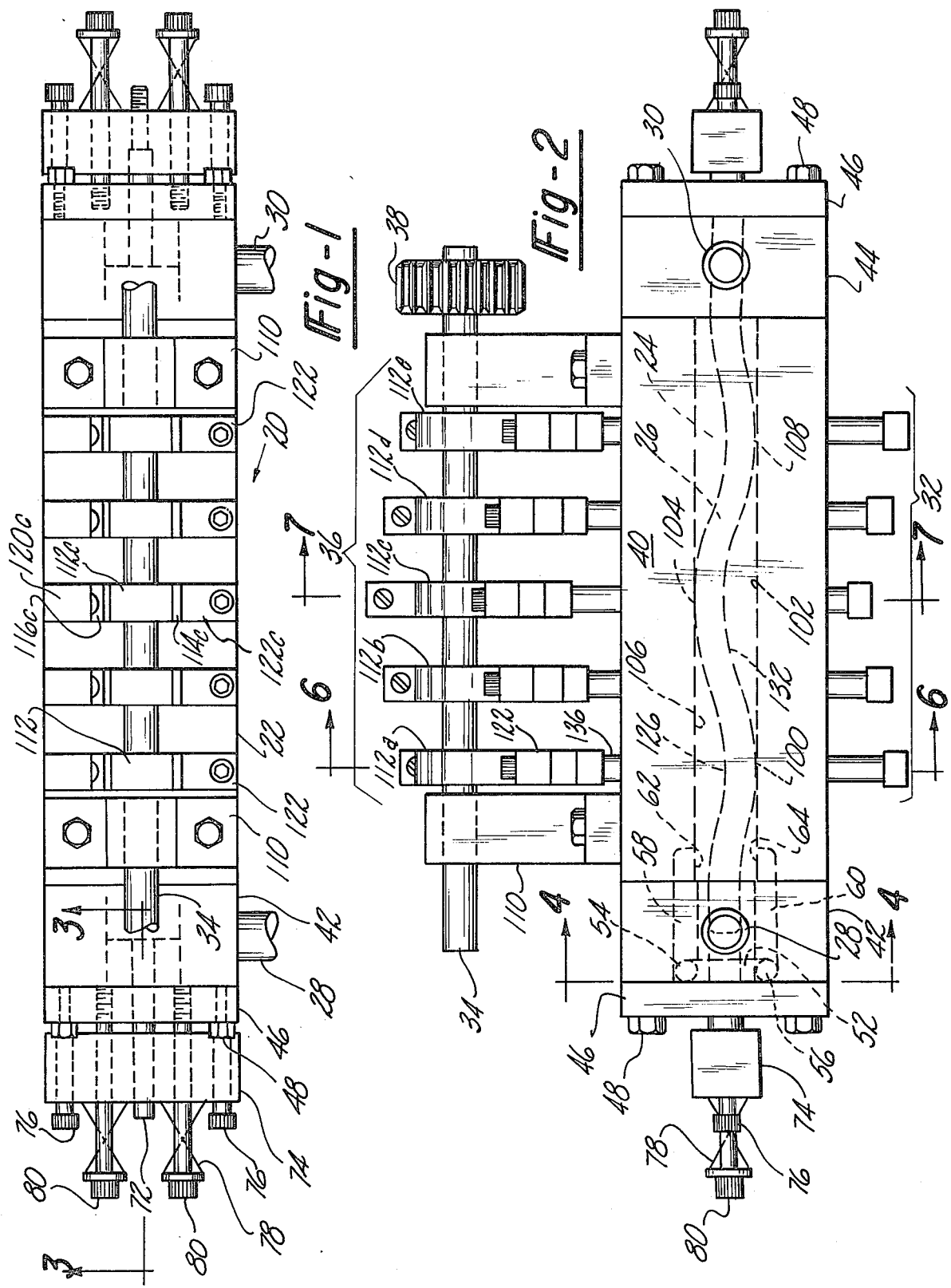

FLUID REACTION DEVICE HAVING AN UNDULATORY FLEXIBLE WALL

This invention relates generally to fluid reaction devices and more particularly to improvements in fluid reaction devices of the type described in my U.S. Pat. No. 3,294,031, granted Dec. 27, 1966, and entitled "Fluid Motor System."

In the fluid motor system of my prior patent, a resiliently flexible wall or diaphragm is mounted in compression in a fluid chamber so as to have an undulatory configuration and undergo undulatory motion in response to fluid flowing through the chamber. One diaphragm was disclosed as being a flat strip of spring steel encased in neoprene. Other materials for the strip diaphragm were also disclosed. Although effective undulatory motion can be achieved with strip constructions, repeated bending and flexing of the strip during extended operation may cause the diaphragm to fail prematurely. The single strip diaphragm in my prior patent also has a tendency to undergo rapid transition between two stable states, producing a slightly rough diaphragm motion and further contributing to failure of the diaphragm. The technique for converting motion of the diaphragm into reciprocating motion, although effective for the proportioning device disclosed in my prior patent, is not ideally suited for heavier loads.

One object of the present invention is to provide an improved fluid reactive device of the type disclosed in my prior patent.

A further object of the present invention is to provide a fluid reaction device of the aforementioned type wherein the diaphragm operates more effectively and more reliably over longer periods of use.

Still further objects of the present invention are to provide a fluid reaction device of the aforementioned type that provides for smooth and even undulation of the diaphragm; that is simple and economical in construction; and/or that effectively converts undulatory motion of the diaphragm into the rotational shaft output.

Other objects, features and advantages of the present invention will become apparent from the following description, the appended claims and the accompanying drawings in which:

FIG. 1 is a side view of a fluid motor constructed according to the present invention;

FIG. 2 is a top plan view of the fluid motor of FIG. 1;

Figure 3:
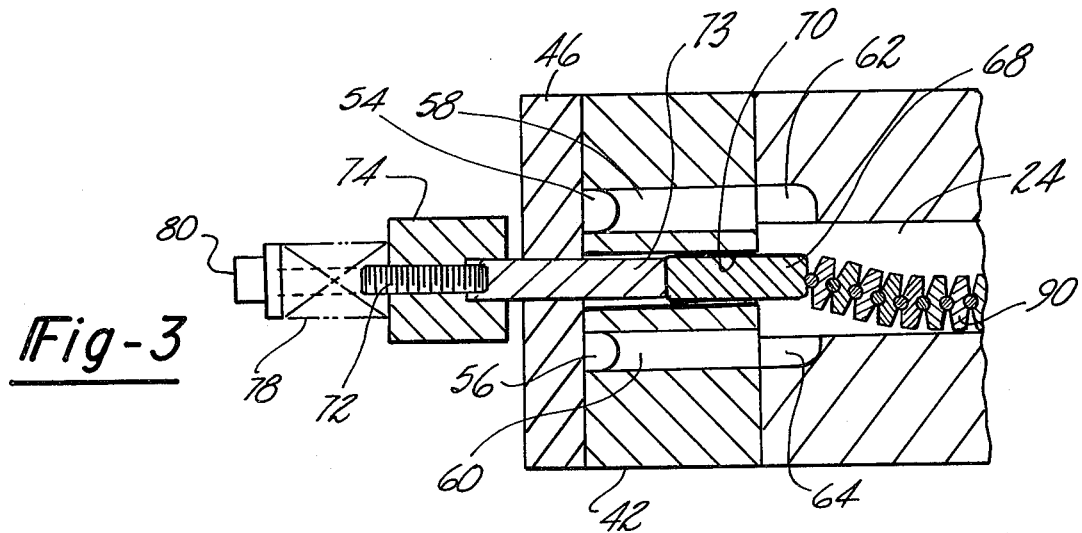
FIG. 3 is an enlarged fragmentary section taken on line 3—3 of FIG. 1.
Figure 4:
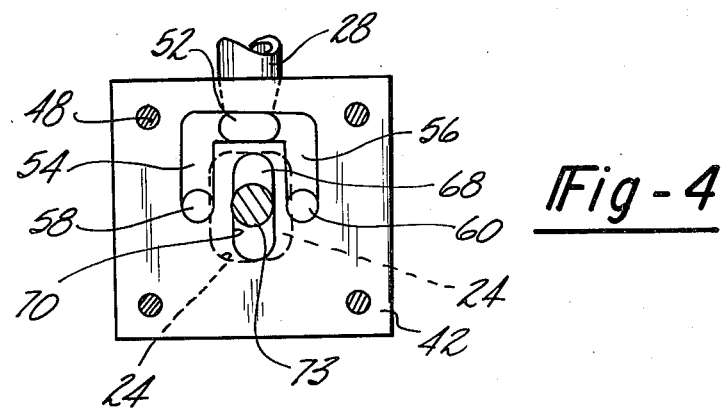
FIG. 4 is a vertical section taken on line 4—4 of FIG. 2.
Figure 5:
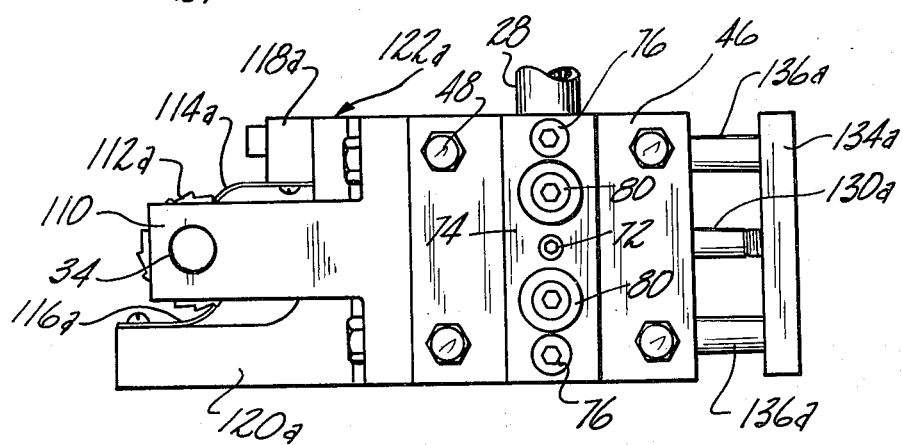
FIG. 5 is an end view taken from the left of FIG. 2.

Referring in greater detail to the drawings, a fluid motor 20 generally comprises an elongated housing 22 having a longitudinally extending chamber 24 of generally rectangular cross section. An elongated, segmented, flexible wall 26 is mounted in chamber 24 so as to undergo undulatory motion in response to fluid flowing from an inlet fitting 28 at one end of housing 22 to an outlet fitting 30 at the other end of housing 22. The motion of the wall 26 actuates a plurality of reciprocating plungers indicated generally at 32 which in turn drive an output shaft 34 via a plurality of ratchets indicated generally at 36. Plungers 32 and ratchets 36 convert the undulatory motion of wall 26 to rotational motion at shaft 34 to drive a suitable output device via gear 38.

Referring to motor 20 in greater detail, the housing 22 comprises a central body portion 40 flanked by an inlet portion 42 at one end and an outlet portion 44 at the other end. Chamber 24 extends longitudinally through portion 40. A pair of end plates 46 and their respective housing portions 42, 44 are securely bolted on body 40 by four screws 48. Suitable gaskets (not shown) may be used between the end plates 46 and their associated housing portions 42, 44 and between the housing portions 42, 44 and the body portion 40 so that chamber 24 is substantially sealed except for fluid entering and leaving the chamber via the inlet and outlet fittings 28, 30. Inlet fitting 28 is connected to a suitable source (not shown) of fluid under pressure such as water. Water supplied at fitting 28 is fed to opposite faces of wall 26 at the left end of chamber 24 as viewed in FIG. 2 via a horizontal passage 52 which splits into short lateral passages 54, 56. Passages 54, 56 in turn communicate with respective short horizontal passages 58, 60 which open at opposite sides of wall 26 through ports 62, 64 in the body portion 40. Outlet fitting 30 is similarly ported to chamber 24 at opposite sides of wall 26.

Each end of wall 26 is reciprocally mounted in its respective housing portion 42, 44 as shown in greater detail in FIG. 3 for the left end. Each housing portion 42, 44 has a generally rectangular guide 70 that extends axially of the housing 22. Elongated end segments 68 are slideably received in the respective guides so that the overall length between the ends of wall 26 can vary during undulatory motion of the wall as will be described. At each end of housing 22 is an adjusting screw 72 that is threaded in a respective cross bar 74 and has its inner end engaged with the outer end of a respective pin 73. Pins 73 in turn are reciprocally mounted in plates 46 with the inner ends of the pins extending into guides 70 to engage the free ends of the respective segments 68. Each of the cross bars 74 is mounted at its respective end of housing 22 by means of a pair of headed guide pins 76 and by a pair of compression springs 78 and retaining pins 80. Pins 76, 80 pass slideably through cross bar 74 and are threaded in the end plate 46 so that the cross bar is slideable on the pins 76, 78. Pins 76 guide bar 74 for reciprocating movement along the axis of chamber 24 and while the heads on pins 76 limit the outward travel of bar 74. Suitable sealing as by 0-rings (not shown) can be provided between pins 73 and end plates 46.

Springs 78 bias bars 74 and hence adjusting screws 72 and pins 73 toward chamber 24 to preload wall 26 in axial compression. When the end segments 68 of wall 26 are inserted in guides 70, inward adjustment of both screws 72 causes wall 26 to be compressed, against the action of springs 78, in chamber 24 into the symmetrical undulatory configuration illustrated in FIG. 2. As will later be more apparent, the shape of the segments in wall 26 assures that wall 26 assumes the symmetrical shape illustrated in FIG. 2 upon tightening of the screws 72. By adjusting screws 72 until wall 26 is in its compressed normal state in contact with the chamber walls, wall 26 can be preloaded by further tightening of screws 72. The preloaded limited travel arrangement of compression springs 78 permits the overall length of wall 26 to vary during undulation of the wall.

Figure 6:
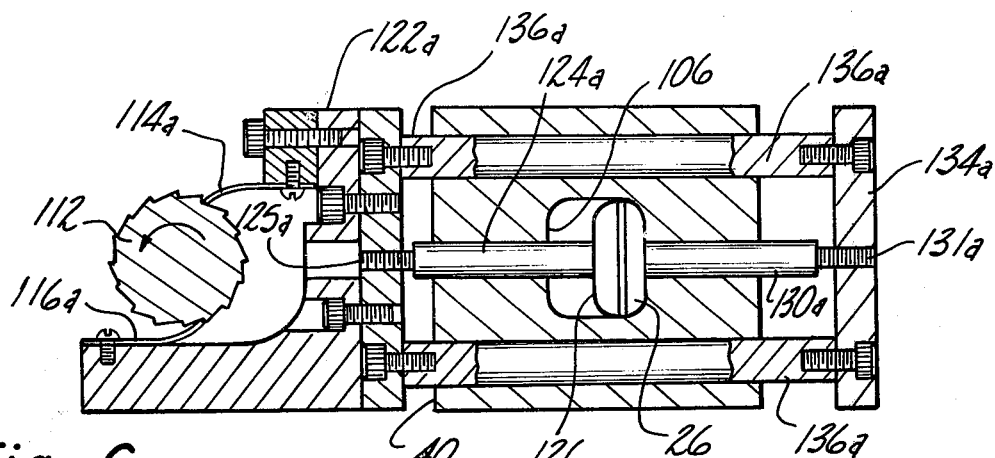
FIG. 6 is a vertical section taken on line 6—6 of FIG. 2.
Figure 7:
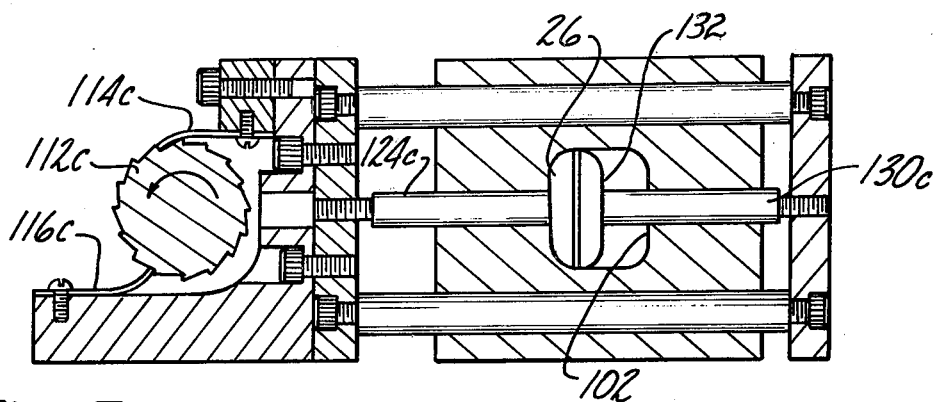
FIG. 7 is a vertical section taken on line 7—7 of FIG. 2.
Figure 8:
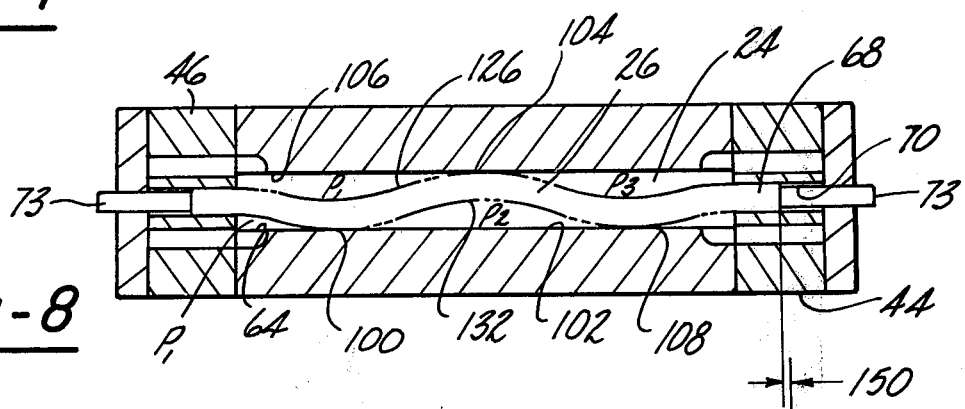
FIGS. 8, 9, 10 and 11 are horizontal sectional views illustrating various stages in the undulatory motion of the flexible wall.
Figure 12:
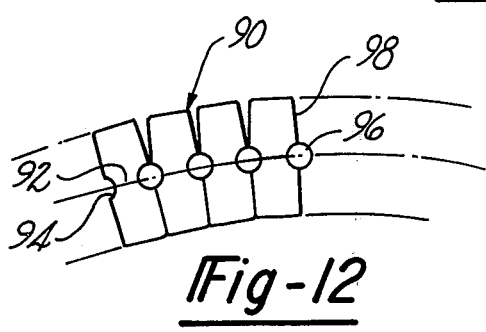
FIG. 12 is a fragmentary view illustrating the segment construction of the flexible wall incorporated in the fluid motor of FIGS. 1 and 2.
Figure 13:
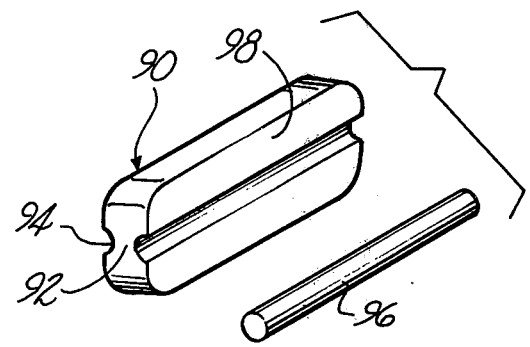
FIG. 13 is an exploded perspective view of the segment and a roller for pivotally interengaging adjacent segments.

As shown in FIGS. 3, 12, and 13, according to one important aspect of the present invention wall 26 comprises a plurality of identical interengaged segments 90 arranged and constructed so that wall 26 can undergo undulatory motion without bending or flexing of the individual segments. Each segment 90 has a symmetrical truncated cross section with an enlarged midsection 92 formed with transverse grooves 94 at opposite sides of the segment. Adjacent segments 90 are pivotally assembled together via a roller bearing pin 96 so that the adjacent segments can pivot on pin 96 during undulatory motion of wall 26. Pins 96 extend the full width of segments 90 and provide a seal between adjacent segments so that fluid cannot pass through wall 26. Inclined faces 98 on each segment are selected to abut corresponding faces on adjacent segments and set a maximum radius of curvature for wall 26. By proper selection of the number, size and shape of the individual segments 90, wall 26 will compress into the symmetrical undulatory configuration illustrated in FIG. 2 with a first crest 100 abutting one wall 102 of chamber 24, a second crest 104 abutting the opposite chamber wall 106 and a third crest 108 abutting wall 102. The peripheral contour of each segment 90 conforms to the transverse contour of chamber 24 so that the crests are substantially sealed against the walls of chamber 24 as shown in FIGS. 6 and 7.

Shaft 34 is journalled on a pair of mounting arms 110 fastened on one side of portion 40 of housing 22. Since each of the ratchets 36 and plungers 32 are of similar construction, corresponding reference numerals will be used with different letter subscripts. Five ratchet wheels 112a, 112b, 112c, 112d, 112e are keyed on shaft 34 at positions spaced longitudinally therealong so that wheels 112a, 112c, 112e are aligned with crests 100, 104, 108, respectively. Wheel 112b is aligned intermediate crests 100, 104, and wheel 112d is aligned intermediate crests 104, 108. Each of the ratchet wheels 112 is actuated by a pair of spring finger pawls 114, 116 mounted respectively on an upper arm 118 and a lower arm 120 of carriers 122. The arrangement of pawls 114, 116 at opposite sides of the axis of ratchet wheels 112 is such that pawls 114 rotate wheels 112 when the carriers 122 move in one direction and pawls 116 rotate wheels 112 in the same direction when carriers 122 move in the opposite direction. Each carrier 122 is reciprocated by a pair of plunger rods 124, 130 having their inner ends engaged respectively with opposite sides 126, 132 of wall 26 and their outer ends confined by respective setscrews 125, 131. Each screw 125 is threaded in carrier 122 into abutment with its associated rod 124 which in turn projects slideably through housing body 40 into chamber 24 and into engagement with wall side 126. In similar fashion, the inner end of rod 130 abuts the opposite wall side 132 with rod 130 projecting slideably through housing body 40. Carrier 122 is actuated by rod 130 by means of screw 131, cross bar 134 and a pair of connecting rods 136 reciprocally mounted in the body portion 40. With the arrangement described, when wall 26 shifts from right to left as viewed in FIG. 7, rod 124 shifts carrier 122 from right to left with pawl 114 rotating wheel 112 in a counterclockwise direction; and similarly when wall 26 shifts from left to right, plunger 130 shifts carrier 122 from left to right with pawl 116 rotating ratchet 112 in a counterclockwise direction. Suitable seals such as O-rings can be provided for rods 124, 130. Pads (not shown) can be used at the respective abutments of rods 124, 130 and wall 26 to reduce the tendency of wall 26 to buckle when the wall actuates the rods. Although the number of ratchets 36 and plungers 32 used can vary depending on the application and the number of crests formed by wall 26, for the particular embodiment described where wall 26 compresses to form three crests, the use of five ratchets positioned as described is preferred to obtain substantially continuous rotation at shaft 34.

Figure 9:
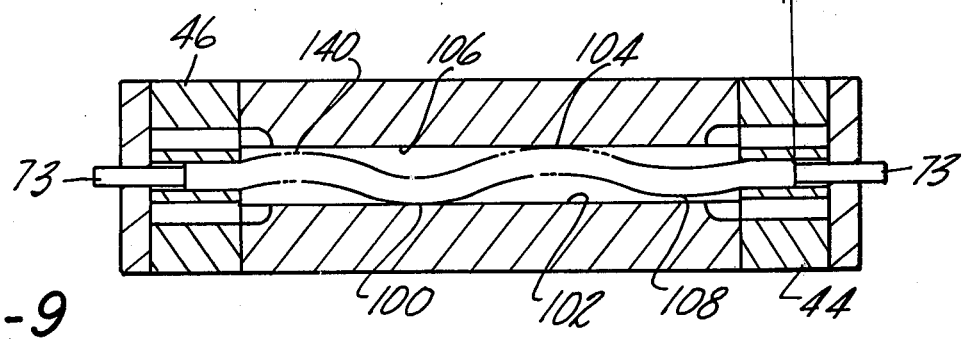
Figure 10:
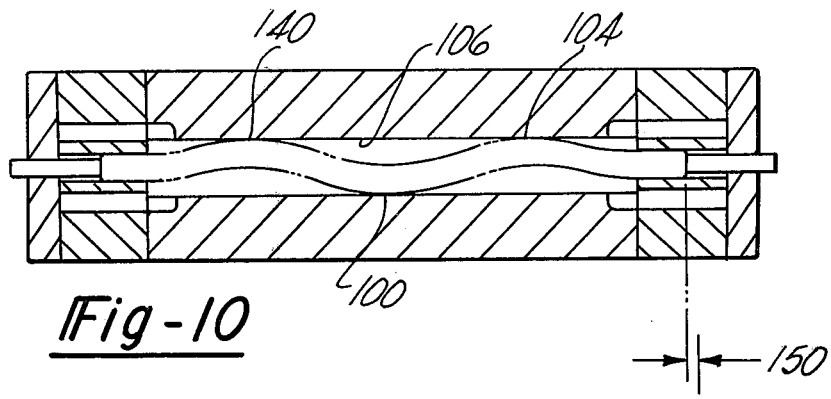
Figure 11:
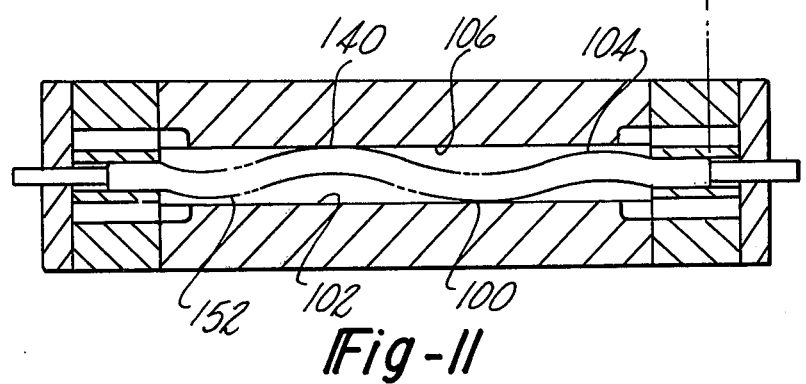

The operation of the fluid motor described hereinabove will be more apparent by reference to FIGS. 8–11 and to my prior U.S. Pat. No. 3,294,031. When water under pressure enters the left end of chamber 24 via fitting 28, a first pressure zone $P_1$ will be established under crest 100, a second zone of lesser pressure $P_2$ will be established under crest 104 and a third zone of still lesser pressure $P_3$ will be established under crest 108. The pressure $P_1$ will also be present to the left of crest 100 (FIG. 8) in the small volume adjacent port 64. The differences in pressure under crests 100, 104, 108 causes wall 26 to distort or compress axially of chamber 24 in a direction from left to right as viewed in FIGS. 8 and 9. As shown in FIG. 9, crests 100, 104 move toward the right while crest 108 begins to disappear at the right end of the chamber and a new crest 140 begins to form at the left end of chamber 24. As wall 26 distorts from its axially compressed configuration illustrated in FIG. 8, to the transition configuration illustrated in FIG. 9, the overall length of wall 26, measured between the ends of the wall, has increased as illustrated by the change 150 (FIGS. 8 and 9) with both ends moving away from chamber 24 against the bias of compression springs 78. It is also noted that in the transition configuration of FIG. 9, only crests 100 and 104 are sealed against the respective chamber walls 102, 106. As water continues to flow under pressure into chamber 24, wall 26 assumes the fully compressed condition illustrated in FIG. 10 with the crests oriented opposite that shown in FIG. 8. Crests 100, 104 have shifted further to the right; crest 108 has disappeared completely; and the new crest 140 has formed fully so as to abut chamber wall 106. The wave motion of wall 26 continues as illustrated in FIG. 11 with crest 100 shifting further to the right, crest 104 disappearing and a new crest 152 forming. During this transition, only two crests contact the chamber walls 102, 106 and the ends of wall 26 have again shifted outwardly of chamber 24.

While wall 26 is undergoing the motion described, carrier 122 will be reciprocated to rotate ratchets 112 and shaft 34. For example, as crest 100 moves from the position illustrated in FIG. 8 to the position illustrated in FIG. 10, carrier 122c shifts from its extreme left position in chamber 24 as shown in FIG. 7 to an extreme right position causing pawl 116 to rotate wheel 122c in a counterclockwise direction. Although the undulatory motion of wall 26 has been described and illustrated in FIGS. 8–11 for only four configurations, it will be understood that the motion of wall 26 is a smooth wave motion due to the segmented construction of the wall and the yieldable mounting of the ends of the wall. Although smooth wall motion is inherent in the segmented construction, the present invention also contemplates but does not require positively coordinating the motion of carriers 122a, 122b, 122c, 122d, 122e. For example, with the arrangement illustrated in FIG. 2, carriers 122a, 122c, 122e can be interconnected by suitable pivoted links so that carriers 122a, 122e move in unison in one direction while carrier 122c moves in the same manner but in the opposite direction. Similarly, carriers 122b and 122d can be connected together by a suitable pivoted link so that carrier 122b moves in one direction at the same rate that carrier 122d moves in the opposite direction.

Figure 14:
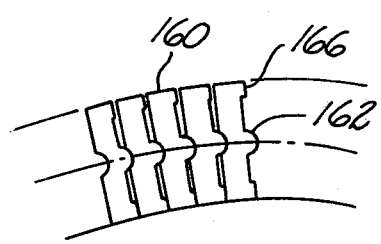
FIG. 14 is a view of an alternative embodiment of the segments for the flexible wall.
Figure 15:
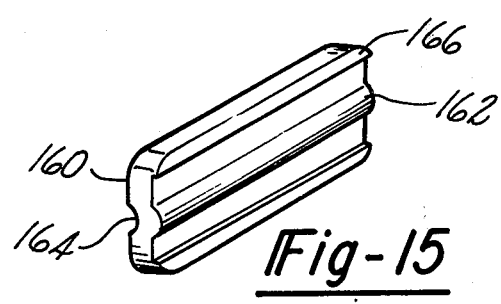
FIG. 15 is a perspective view of the segments in the flexible wall of FIG. 12.

FIGS. 14 and 15 illustrate an alternative form of one-piece wall segments 160 nested together to form wall 26. Each segment 160 has transverse ribs 162 at one side and a rounded groove 164 at the opposite side. Rib 162 and groove 164 are centered between the top and bottom of the segment. At the top and at the bottom of each segment are right angled flanges 166 that protrude slightly less than rib 162. When segments 160 are nested together, wall 26 will have a maximum radius of curvature when the flange 166 on one segment 160 abuts the adjacent segment 160. As with segments 90, the peripheral contour of segments 160 matches the contour of chamber 24.

Although a specific embodiment of the present invention has been described hereinabove, several of the features of the present invention could be incorporated into other types of similar fluid motors, for example, motors of the type disclosed in my prior patent. The solid-strip, flexible wall of the type disclosed in my prior patent could be mounted so that the wall is preloaded and the ends can move to achieve a smoother, more even undulatory motion. Similarly, the ratchet and reciprocating plunger arrangement described hereinabove could be actuated by a solid strip diaphragm of the type disclosed in my prior patent. As with the fluid motor in my prior patent, the output at shaft 34 will be proportional to the rate of fluid flow through chamber 24. However, with the smoother and more continuous motion of the segmented wall 26 and yieldable end mounting of the wall, the fluid motor of the present invention will achieve better proportionality over a wider range of fluid flow rates and particularly at low flow rates. However, one of the more important features of the present invention is forming the flexible wall of individual segments that are not subjected to bending or flexing. Moreover, the individual segments can be constructed to limit the maximum radius of curvature in the wall and hence predetermine the axially compressed configuration of the wall. Due to the interlocking construction of the segments, the curves of the segmented wall can withstand high side pressures from rods 124, 130 without buckling. In this regard, for certain applications it may be necessary to string the individual segments on a cable or the like to eliminate any possibility that the interlocking segments can shift relative to each other and cause the entire wall to buckle or come apart. Stringing the segments on a small cable would also facilitate assembly of the segments as a unit into the motor. Where a one-piece housing body 40 is used, assembly of the segments in the motor can be facilitated by use of a simple fixture that is removed after the wall is properly located; or alternatively a soluble adhesive could be used to temporarily keep the segments together while they are assembled in the chamber. Of course, the housing body 40 could be of two-piece construction to facilitate assembly of the wall in the chamber.

By way of further illustration, where water is the propelling fluid, the housing body portion 40 could be made of stainless steel and the segments of brass. Of course, the present invention contemplates use of other materials and propelling fluids other than water. Moreover, the present invention would be useful where hot gases are the propelling fluid, as in a turbine. For the latter application, the wall segments could be of ceramic or other suitable materials to withstand high temperature. The present invention would also be useful when propelled by hot expanding gases supplied to inlet 28 from external combustion or internal combustion sources and is potentially useful with internal combustion occurring within chamber 24 to provide the necessary pressure differentials across the wall, for example, under one or more of the crests 100, 104 and 108. Although a direct seal between the segments and the chamber walls is preferred, for example, the metal-to-metal seal between brass segments and a stainless steel housing, it will be understood that the seal between the flexible wall 26 and the walls of chamber 24 can be provided using other constructions, for example, by encapsulating the individual segments in a suitable material such as neoprene or urethane. Although the fluid reaction device of the present invention has been described herein in its preferred embodiment as a motor, it will be understood that the device, with minor modification, could be operated as a pump as will be apparent to those skilled in the art.

It will be understood that the fluid motor has been disclosed and described herein for purposes of illustration and is not intended to indicate limits of the present invention, the scope of which is defined by the following claims.

I claim:

1. A fluid reaction device comprising means forming a walled chamber, fluid inlet means at one end of said chamber, fluid outlet means at the opposite end of said chamber, said chamber being adapted to accommodate fluid flowing therethrough along an axis generally in a direction between said inlet means and said outlet means, a flexible wall mounted in said chamber and being arranged and constructed to be compressed in said chamber into an undulatory configuration to form a series of oppositely directed crests along said axis with adjacent ones of said crests sealably abutting opposite walls of said chamber, said flexible wall being adapted to undergo undulatory motion in said chamber correlated to fluid flow through said chamber, said flexible wall having a first predetermined length along said axis when said flexible wall is in said compressed undulatory configuration, and retainer means on said device engaging said flexible wall to compress said flexible wall into said undulatory configuration, said retainer means comprising means resiliently urging an end portion of said flexible wall adjacent one end wall of said chamber in a direction along said axis toward the opposite end wall of said chamber to yieldably urge said flexible wall into said compressed undulatory configuration, at least part of said means resiliently urging said end portion being yieldably movable so that said flexible wall can elongate in a direction along said axis during undulatory motion of said flexible wall.

2. The fluid reaction device set forth in claim 1 wherein one end of said chamber is formed with a guide therein, said end portion of said flexible wall is slideably mounted in said guide and wherein said retainer means is arranged and constructed so that said wall end portion can reciprocate in said guide during undulatory motion of said wall.

3. The device set forth in claim 1 wherein said retainer means includes adjustable stop means movable longitudinally of said chamber along said axis to compress said flexible wall into said compressed configuration and simultaneously preload said means resiliently urging said flexible wall.

4. The device set forth in claim 1 wherein said retainer means further includes a member mounted on said device exteriorly of said chamber and adjacent said one end wall, means on said member extending through said one end wall into engagement with said end portion of said flexible wall, and wherein said means resiliently urging said flexible wall includes compression spring means urging said member in a direction along said axis toward said opposite end wall of said chamber.

5. The device set forth in claim 1 wherein said flexible wall is segmented.

6. The device set forth in claim 1 wherein said flexible wall comprises a series of individual segments, each segment being pivotal relative to adjacent segments on a pivot axis generally transverse to a plane containing said flow axis.

7. The device set forth in claim 6 wherein adjacent segments are interlocked against relative shifting movement.

8. The device set forth in claim 6 wherein each of said segments is a thin plate extending the full width of said chamber in a direction generally transverse to said flow axis.

9. The device set forth in claim 6 wherein each of said segments has an outer peripheral contour that matches the contour of said chamber so as to provide a sealed interface therebetween at said crests.

10. The device set forth in claim 6 wherein said flexible wall includes means for limiting the extent of pivotal movement of each segment so as to limit the maximum radius of curvature of said crests.

11. The device set forth in claim 10 wherein each of said segments includes means for limiting pivotal movement of each segment relative to adjacent segments to thereby limit the radius of curvature of said crests.

12. A fluid reaction device comprising means forming a walled chamber, fluid inlet means at one end of said chamber, fluid outlet means in said chamber, a flexible wall mounted in said chamber and being compressed in said chamber into an undulatory configuration along an axis of said chamber between said inlet and outlet means to form a series of oppositely directed crests along said axis with adjacent ones of said crests sealably abutting opposite walls of said chamber, means for creating a pressure differential underneath crests adjacent to each other, said flexible wall being adapted to undergo undulatory motion in said chamber in response to pressure differentials underneath adjacent crests, said flexible wall having a first predetermined length along said axis when said wall is in said compressed undulatory configuration, and means resiliently urging an end portion of said flexible wall in a direction along said axis toward the opposite end wall of said chamber to yieldably urge said flexible wall into said compressed undulatory configuration, at least part of said means resiliently urging said end portion being yieldably movable so that said flexible wall can elongate in a direction along said axis during undulatory motion of said flexible wall.

13. A fluid reaction device comprising means forming a walled chamber, fluid inlet means at one end of said chamber, fluid outlet means at the opposite end of said chamber, said chamber being adapted to accommodate fluid flowing therethrough along an axis generally in a direction between said inlet means and said outlet means, a flexible wall mounted in said chamber and being arranged and constructed to be compressed in said chamber into an undulatory configuration to form a series of oppositely directed crests along said axis with adjacent ones of said crests sealably abutting opposite walls of said chamber, said flexible wall being adapted to undergo undulatory motion in said chamber correlated to fluid flow through said chamber, said flexible wall having a first predetermined length along said axis when said flexible wall is in said compressed undulatory configuration, and retainer means mounted on said device and engaging one end of said flexible wall to operatively compress said flexible wall into said undulatory configuration, said retainer means including means applying to one end of said flexible wall a force in a first direction axially of said chamber toward an opposite end of said wall to compress said wall in said chamber into said undulatory configuration, said force applying means being mounted on said device for reciprocal movement in opposite directions along said axis so that said wall can elongate in a direction along said axis during undulatory motion of said wall.

14. The device set forth in claim 13 wherein said force applying means is resiliently yieldable in a direction along said axis to yieldably urge said wall into said compressed undulatory configuration.

* * * * *